United States Patent

[11] 3,559,674

| [72] | Inventors | Fritz Ostwald<br>Buchschlag;<br>Gerhard Nonn, Hofheim, Taunus, Germany |
| --- | --- | --- |
| [21] | Appl. No. | 762,406 |
| [22] | Filed | Sept. 25, 1968 |
| [45] | Patented | Feb. 2, 1971 |
| [73] | Assignee | Alfred Teves GmbH<br>Frankfurt am Main, Germany<br>a corporation of Germany |
| [32] | Priority | Oct. 2, 1967 |
| [33] | | Germany |
| [31] | | 67T34929 |

[54] MOUNTING PLATE FOR HYDRAULIC INSTALLATIONS AND METHOD OF MAKING SAME
9 Claims, 4 Drawing Figs.

[52] U.S. Cl............................................... 137/375, 137/608
[51] Int. Cl............................................... F16l 39/00
[50] Field of Search........................................ 137/608, 375

[56] References Cited
UNITED STATES PATENTS

| 2,445,414 | 7/1948 | Zabriskie et al. | 137/375 |
| --- | --- | --- | --- |
| 2,497,780 | 2/1950 | Lawson | 137/375 |
| 2,651,324 | 9/1953 | Hodgson | 137/608X |
| 3,217,739 | 11/1965 | Valley et al. | 137/375 |
| 3,234,963 | 2/1966 | Lyon | 137/608 |
| 3,259,145 | 7/1966 | Engle | 137/608 |
| 3,367,358 | 2/1968 | Rentschler | 137/375 |
| 3,425,456 | 2/1969 | Schibig | 137/375X |
| 3,464,447 | 9/1969 | Jones | 137/608 |

*Primary Examiner*—Samuel Scott
*Attorney*—Karl F. Ross

ABSTRACT: A mounting plate for hydraulic installations, such as hydraulic reservoirs, pumps, motors, control valves and servomechanisms, wherein a network of fittings and ducts is initially formed by soldering tubular conduits to cast or forged fittings (adapted to be threadedly connected to the hydraulic devices). The network is thereafter cast in a synthetic resin, usually a polyester, such that the fittings are flush with the surface of the resin and the latter fills the interstices between the fittings and the ducts to cushion the latter and resiliently damp vibration and noise.

FRITZ OSTWALD
INVENTOR.

BY Karl F. Ross
ATTORNEY

MOUNTING PLATE FOR HYDRAULIC INSTALLATIONS AND METHOD OF MAKING SAME

Our present invention relates to support plates or structures for hydraulic installations and, more particularly, to hydraulic distribution networks formed in supporting structure for hydraulic devices as well as to a method of making same.

It has been the practice heretofore to provide hydraulic systems with fluid-transmission networks which can be constituted either as rigid or as flexible ducts for tying a source of fluid under pressure, e.g. a pump, to the load and various control elements therefor. A typical hydraulic system (see Fluid Power, U.S. Government Printing Office Washington, D.C., 1966) is provided with various hydraulic devices which must be interconnected by fittings and duct works in a circulatory or bidirectional arrangement.

It is not uncommon for a typical hydraulic system to include a pump, a pressurized or nonpressurized reservoir from which the pump draws the hydraulic fluid, a strainer or filter in line with the reservoir, and an air breather or vent for the reservoir, input and output lines, pressure and/or level gauges, check valves, bypass valves, control valves and hydraulic loads including accumulators, reciprocating (piston) motors or rotating hydrodynamic or hydrostatic motors.

In a common construction of hydraulic systems of this general type, a mounting plate is provided close to the load, the control arrangement, the pump or the reservoir which consists of a support plate carrying the reservoir, pump, motor and/or control valves and serving, at least in part, to connect hydraulically the several components. In such systems the mounting plate has heretofore been cast of metal and has been bored or threaded to form the desired hydraulic connections therein with various ports being tapped to accommodate threaded members or being provided with flanges against which annular seals can be clamped when the hydraulic devices are affixed to the plate.

The complexities of hydraulic networks have rendered such systems highly expensive and difficult to design so that support plates of this type have been avoided whenever the hydraulic network must have a large number of ports. Another disadvantage of such systems is that they are sensitive to vibration which is almost an inherent characteristic of hydraulic systems using reciprocating control or regulatory valves, pumps and motors.

It is, therefore, the principal object of the present invention to provide an improved support plate for hydraulic installations of the character described which can include a fluid-distribution network of considerable complexity and at relatively low cost.

A further object of this invention is to provide an improved mounting plate and fluid network for a hydraulic system which is of lightweight, compact construction and is less prone to deterioration under vibratory stresses.

Still another object of this invention is to provide a noise-damping support plate of the character described with improved sealing of the junctions between the hydraulic device and the network.

According to our present invention, the support plate of a hydraulic installation includes a fluid-transmission network composed of a plurality of fittings adapted to be connected to the several hydraulic devices and provided with ports for this purpose, and duct members interconnecting these fittings and preferably composed of metal and soldered to the fittings; the entire network is cast in a synthetic resin to form a plate with the resin filling the interstices of the network while the ports of the fittings open at the exterior of the resulting plate.

Advantageously, the fittings have flat surfaces at which the ports open, these surfaces being flush with corresponding surface of the plate, thereby facilitating the sealed mounting of one or more hydraulic devices upon the plate or the sealed positioning of the plate of one or more hydraulic devices.

According to a further feature of this invention at least some of the fittings extend the full thickness of the support plate and have surfaces flush with opposite sides thereof with at least one fitting having a port on each side of the resulting plate. One or more of the fittings may be wholly imbedded in the support plate so that they constitute solely a junction between two or more of the duct members of the distribution network and still other fittings may have a length less than the thickness of the plate so that they are exposed only at one side of the latter.

We have found that a construction of this character not only affords advantages with respect to the cost of the device and the economy of labor and material in the formation and use thereof, but also that the system is fully sealed even under high pressures inasmuch as substantially all of the junctions between the tubular duct members and the fittings, primarily sealed by soldering, are secondarily sealed or reinforced by the synthetic resin.

Vibrations transmitted via the fluid or by direct mechanical contact for the hydraulic devices are damped by the synthetic resin which is limitedly but resiliently yieldable to act as a cushion. The vibratory stresses to which the network is exposed are thus reduced and there is substantially no vibration transmission from one device to another device when these devices are connected to fittings spaced apart in the plate. Additionally, this resiliency of the support plate serves to cushion noises arising from the hydraulic installation.

While the expression "fitting" is used here in its generic sense and is recognized by the art to include substantially all devices which may serve to transmit fluid from a duct member to another duct member or to a functional element of the hydraulic system, it may be mentioned that we also intend to include within the meaning of this expression elements which can be termed "connectors" and serving as pipe junctions as well as junctions between the hydraulic devices and a pipe. Elbows, crosses, Tees and bulkhead-mounting connectors are included, whether of the flange or flare type.

We have found that best results obtain when the synthetic resin in which the fluid-transmission network is imbedded, is a polyester synthetic resin, e.g. a resin of the styrene/alkyl type. Suitable casting resins for this purpose are marketed under the names of LAMINAC and PLYOLITE.

According to another feature of this invention, the junctions between the fitting and the duct members (e.g. copper tubes) are sealed with solder by providing a solder strip (solder ring) on the interior of each socket of the fitting and/or the exterior of the copper tube received therein. After the entire network has been interfitted and assembled in this manner, the network is heated to the flow temperature of the solder to bond and seal all of the junctions in a single step. Thereafter, the network is inserted into a form of prismatic configuration and cast into a support plate.

The first step may also make use, according to this invention, of solder rings which are slipped over the tube or inserted into the socket and which melt when the entire network is heated to the soldering temperature in a furnace under an antioxidation atmosphere (e.g. nitrogen, reducing exhaust gas, hydrogen, or a mixture of carbon monoxide and hydrogen or a hydrocarbon).

The above and other objects, features and advantages of the present invention will become more readily apparent from the following description given with reference to the accompanying drawing, in which.

Figure 1:
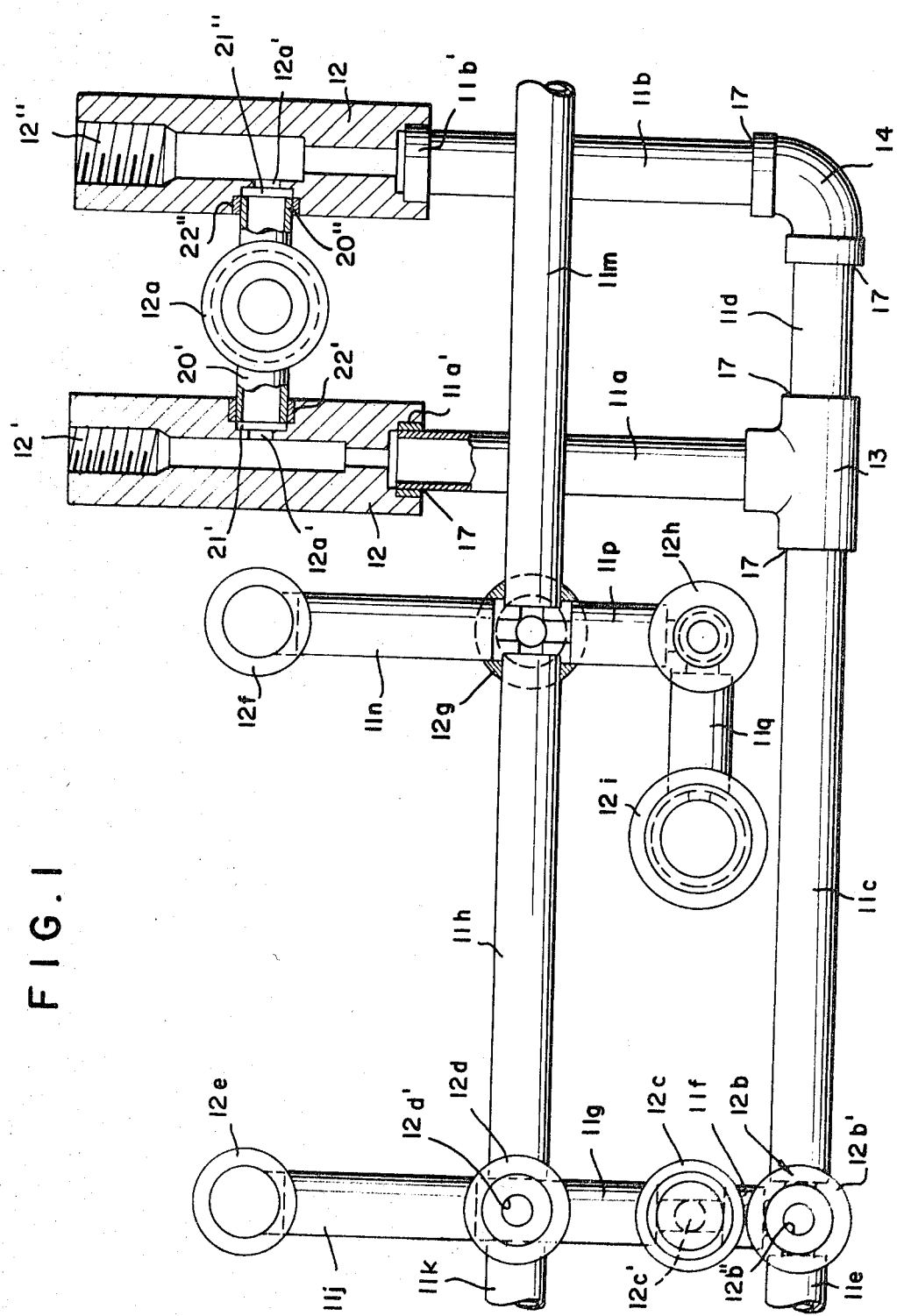
FIG. 1 is a plan view of a hydraulic network prior to casting in the polyester resin, according to our invention.

In FIG. 1 of the drawing, we show a hydraulic network comprising a pair of horizontal fittings 12 having ports 12' and 12" threaded to receive respective bulkhead fittings connectable to a pair of "loads," e.g. hydraulic motors such as piston-and-cylinder arrangements. An upright fitting 12a is connected to the ports 12a' and 12a" of the fittings 12 and serves to hydraulically tie the system to an accumulator which may be of the type described in Fluid Power (op. cit)

The connection is made by a pair of copper nipples 20' and 20" which are inserted into the sockets 21' and 21" of the fittings 12, respectively, and into corresponding sockets in the fitting 12a. These nipples are surrounded by solder rings as shown at 22' and 22", respectively to seal the duct members 20' and 20" to the fittings 12 and 12a when the entire network is heated to the flow temperature of the solder in a furnace under a protective gas atmosphere as previously described.

The hydraulic fluid can be supplied to the fittings 12 by copper tubes 11a and 11b which are sealed via solder rings 11a' and 11b' to the fittings as previously described and are connected via an elbow 14 and a Tee 13 with a main hydraulic line 11c and 11d. The solder joints at each junction are represented at 17 and are formed with solder rings as shown at 22' and 22" mentioned earlier The fluid may be delivered by a pump connected at 11e to a fitting 12b which has its upper surface 12b' flush with a corresponding surface of the imbedding resin (see FIG. 3) and is provided with an internally threaded bore 12b'' connectable to a pressure gauge (see Fluid Power). A further fitting 12c is also illustrated in FIG. 1 as constituting part of the hydraulic network imbedded in the synthetic resin and is connected via the duct member 11f to fitting 12b and may also serve as a check valve as represented at 12c'.

The duct member 11g connects the valve 12c to a distribution fitting 12d whose bore 12d' allows another gauge to be connected to the system and which forms a junction between the return line 11h and a line 11j connected to the fitting 12e through which the system empties into the reservoir. Line 11k allows the reservoir to serve still another hydraulic networks of similar construction. Fittings 12f, 12g, 12h and 12i, together with the lines 11m, 11n, 11p and 11q, are interconnected with solder junction 17 as previously described and form the return ports from the hydraulic loads and/or any control valves which may be required.

Figure 2:
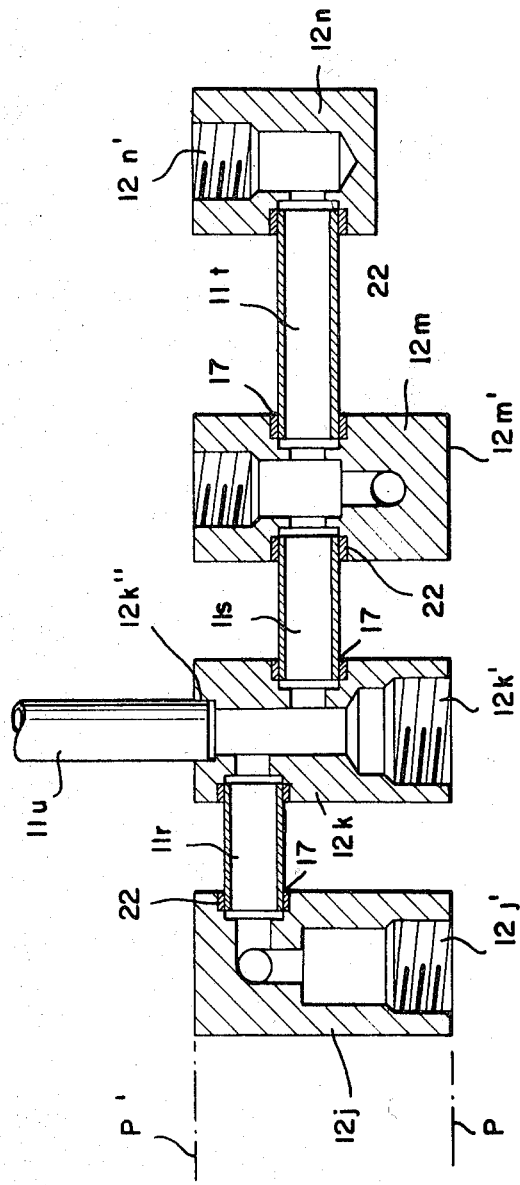
FIG. 2 is a cross-sectional view through a portion of such a network.

From FIG. 2, it can be seen that the fittings 12j and 12k have threaded ports 12j' and 12k' for connection to the respective hydraulic devices; the ports open flush with a common plane P at which the bottom surface 12m' of a fitting 12m terminates. The duct members 11r, 11s and 11t are all soldered to the fittings by the solder junctions 17 and the solder rings 22 previously described.

The fitting 12k has a port 12k'' in which may be soldered a tubular member 11u after the assembly has been completed, the port opening flush with the plane P' at the other side of the array.

The fitting 12n has its port 12n' opening flush with the plane P but does not extend the full width of the array between the planes P and P'.

Figure 3:
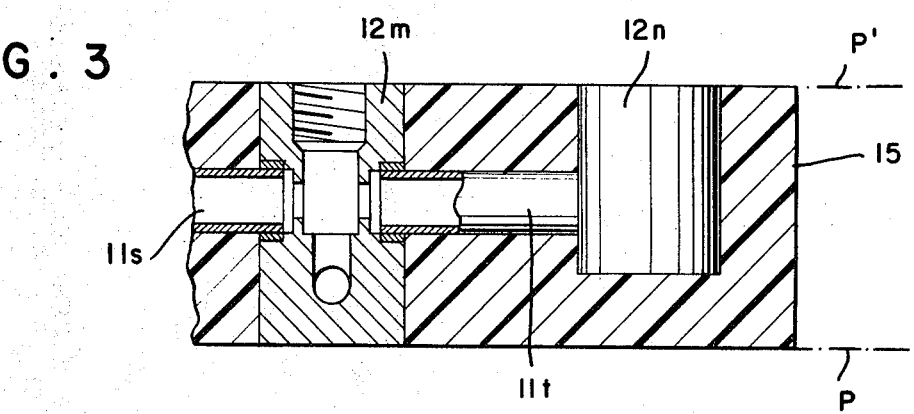
FIG. 3 is a fragmentary view illustrating a portion of the device in section after casting.
Figure 4:
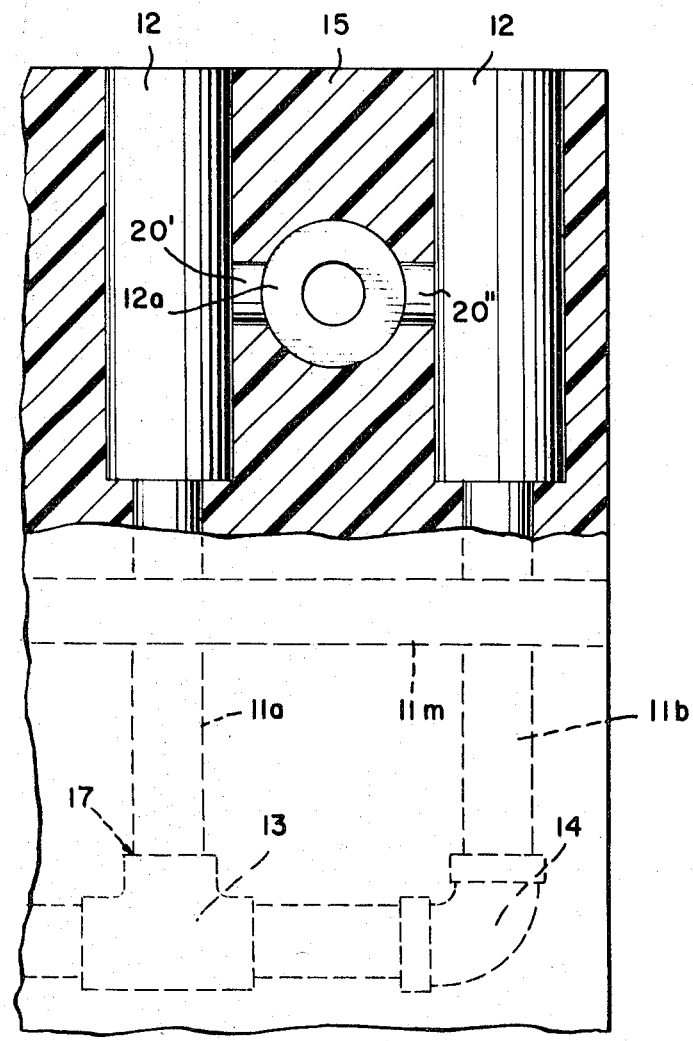
FIG. 4 is a plan view of a portion of the plate partly broken away.

After the assembly has been soldered in a single operation, it can be cast in the synthetic resin 15 as shown in FIGS. 3 and 4 so that the planes P and P' correspond to the opposite sides of the resulting plate. The polyester resin cushions vibrations and noise and serves as an additional seal for the assembly and allows the ports 11j' and 11n' etc. to receive conventional bulkhead or compression fittings.

The improvement described and illustrated is believed to admit of many modifications within the ability of persons skilled in the art, all such modifications being considered within the spirit and scope of the invention except as limited by the appended claims.

We claim:

1. A mounting and fluid-distribution plate for a hydraulic installation, comprising:
    a synthetic-resin body having at least two planar surfaces;
    at least three fittings imbedded in said body and each having a flat face formed with a threaded port, at least two of said fittings having their said faces flush with one of said surfaces and another of said fittings having its said face flush with the other of said surfaces; and
    straight duct members imbedded in said body and rigidly attached to and interconnecting said fittings, said members and said fittings forming a hydraulic transmission network completely surrounded by said body with only said faces exposed.

2. The plate defined in claim 1 wherein said duct members are soldered to said fittings.

3. The plate as defined in claim 1 wherein said synthetic resin is a polyester resin.

4. The plate as defined in claim 1 wherein said network further includes at least one elbow connected with at least one elbow connected with at least one of said fittings by a respective duct member.

5. The plate as defined in claim 1 wherein said network further includes at least one Tee connected with at least one of said fittings by a respective duct member.

6. The plate defined in claim 1 wherein said surfaces are substantially parallel.

7. The plate as defined in claim 6 wherein at least one of said fittings terminates flush with both of said surfaces.

8. A method of making a mounting and fluid-distribution plate comprising the steps of:
    interconnecting a plurality of straight duct members with a plurality of fittings to form a hydraulic transmission network, at least three of said fittings having each a flat face formed with a threaded port, two of said faces being coplanar; and
    encapsulating said network in a synthetic-resin body having at least two flat surfaces with the two coplanar faces flush with one of said surfaces, and the face of the other fitting flush with the other surface such that only said faces are exposed.

9. The method defined in claim 8 wherein said duct members are inserted in said fittings together with solder rings, said method further comprising the step of heating said network in an antioxidation atmosphere to the flow temperature of said solder rings simultaneously to bond all of said duct members to said fittings.